United States Patent [19]

Harrington

[11] Patent Number: 5,245,809

[45] Date of Patent: Sep. 21, 1993

[54] URETHANE INSULATING PANEL AND METHOD

[76] Inventor: Bruce E. Harrington, 235 Hampton Pl., Jupiter, Fla. 33458

[21] Appl. No.: 701,062

[22] Filed: May 16, 1991

[51] Int. Cl.⁵ .............................................. E04C 1/00
[52] U.S. Cl. ............................ 52/309.11; 52/745.19
[58] Field of Search ................. 52/309.11, 309.9, 809, 52/741

[56] References Cited

U.S. PATENT DOCUMENTS

| | | | |
|---|---|---|---|
| 3,196,499 | 7/1965 | Houvener | 52/809 |
| 3,235,040 | 2/1966 | Ellis | 52/809 |
| 3,242,240 | 3/1966 | Tantlinger | 52/743 |
| 3,331,174 | 7/1967 | Wesch | 52/309.11 |
| 3,462,897 | 8/1969 | Weinrott | 52/309.11 |
| 3,783,563 | 1/1974 | Moore | 52/309.9 |
| 3,802,141 | 4/1974 | Hayes | 52/309.11 |
| 3,835,611 | 9/1974 | Villeger | 52/809 |
| 4,114,333 | 9/1978 | Jones | 52/309.11 |
| 4,193,240 | 3/1980 | Odoerfer | 52/743 |
| 4,288,962 | 9/1981 | Kavanaugh | 52/743 |
| 4,439,966 | 4/1984 | Alles | 52/309.11 |
| 4,712,352 | 12/1987 | Low | 52/809 |

Primary Examiner—Carl D. Friedman
Assistant Examiner—Creighton Smith
Attorney, Agent, or Firm—Ruffin B. Cordell

[57] ABSTRACT

A panel for providing walls, roofs and floors with thermal insulation and fire retardance includes at least two essentially parallel face members separated to form a space between the face members and urethane within the space to provide the thermal insulation and fire retardance. The panel may additionally include frame members extending between the face members for providing support and for enclosing the urethane. At least one of the frame members has at least one port through which urethane foam can enter between the face members. A method for creating a panel for providing insulated and fire retardant walls, floors and roofs, includes the steps of joining frame members together to form a panel frame of the desired dimensions, attaching face members to either side of the panel frame so that at least one enclosed space is formed within the face members and frame members, creating at least one port leading into the at least one enclosed space, and injecting urethane foam through the at least one port into the at least one enclosed space. The frame members may be positioned and the face members cut to provide window and door openings through the panel.

10 Claims, 5 Drawing Sheets

URETHANE INSULATING PANEL AND METHOD

BACKGROUND OF THE INVENTION

1. Field of the Invention

The present invention relates generally to the field of construction panels, and more specifically to a panel having interior and exterior face members and a space therebetween containing urethane for providing thermal insulation and fire retardance.

2. Description of the Prior Art

Several types of panels have been designed for constructing or adding insulation to walls and roofs of buildings. One has an essentially rectangular styrofoam core with aluminum sheets bonded to either side. The walls and roof of a building can be formed by joining the edges of these panels together. These panels can also be placed over an existing wall or roof to enhance insulation. A problem with this type of core is that it is inflammable and thus can create a serious fire hazard. Another problem is that a joined series of these panels is not as strong as a traditional building frame.

The primary alternative has been to build a conventional wooden frame and unroll insulating material between parallel frame members. This approach is illustrated in Evans, U.S. Pat. No. 3,762,112, issued on Oct. 2, 1973. Evans teaches a method of making a modular building. Building sections are formed of gypsum board sheets secured to parallel beams. Insulating material is unrolled between the beams before the gypsum board is attached. The most fire retardant insulating material used in the past has probably been asbestos. The revelation that asbestos fibers cause cancer has eliminated this alternative from the market. Other types of insulating material have been used, but are less fire resistant.

It is thus an object of the present invention to provide a construction panel having very high fire retardant properties.

It is another object of the present invention to provide a construction panel which is simple in structure and inexpensive.

It is still another object of the present invention to provide a construction panel which is structurally equivalent to a conventional building frame.

It is finally an object of the present invention to provide a construction panel which is capable of prefabrication and mass production.

SUMMARY OF THE INVENTION

The present invention accomplishes the above-stated objectives, as well as others, as may be determined by a fair reading and interpretation of the entire specification.

A panel for providing walls, roofs and floors with thermal insulation and fire retardance includes at least two essentially parallel face members separated to form a space between the face members and urethane within the space to provide the thermal insulation and fire retardance. The panel may additionally include frame members extending between the face members for providing support and for enclosing the urethane. The frame members are preferably U-shaped channels and made of metal. The face members may be secured to the frame members with sheet metal screws. The face members may be made of stucco board, such as a product known as Densglass, of drywall, or of plywood decking. The frame members may extend only along the perimeter of the face members of both along and within the perimeter of the face members. At least one of the frame members has at least one port through which urethane foam can enter between the face members.

A method for creating a panel for providing insulated and fire retardant walls, floors and roofs, includes the steps of joining frame members together to form a panel frame of the desired dimensions, attaching face members to either side of the panel frame so that at least one enclosed space is formed within the face members and frame members, creating at least one port leading into the at least one enclosed space, and injecting urethane foam through the at least one port into the at least one enclosed space. The at least one port is preferably created in at least one frame member. Screws may be fitted through the frame into an object separate from the panel to secure the panel in position. The frame members may be positioned and the face members cut to provide window and door openings through the panel.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENT

Figure 1:
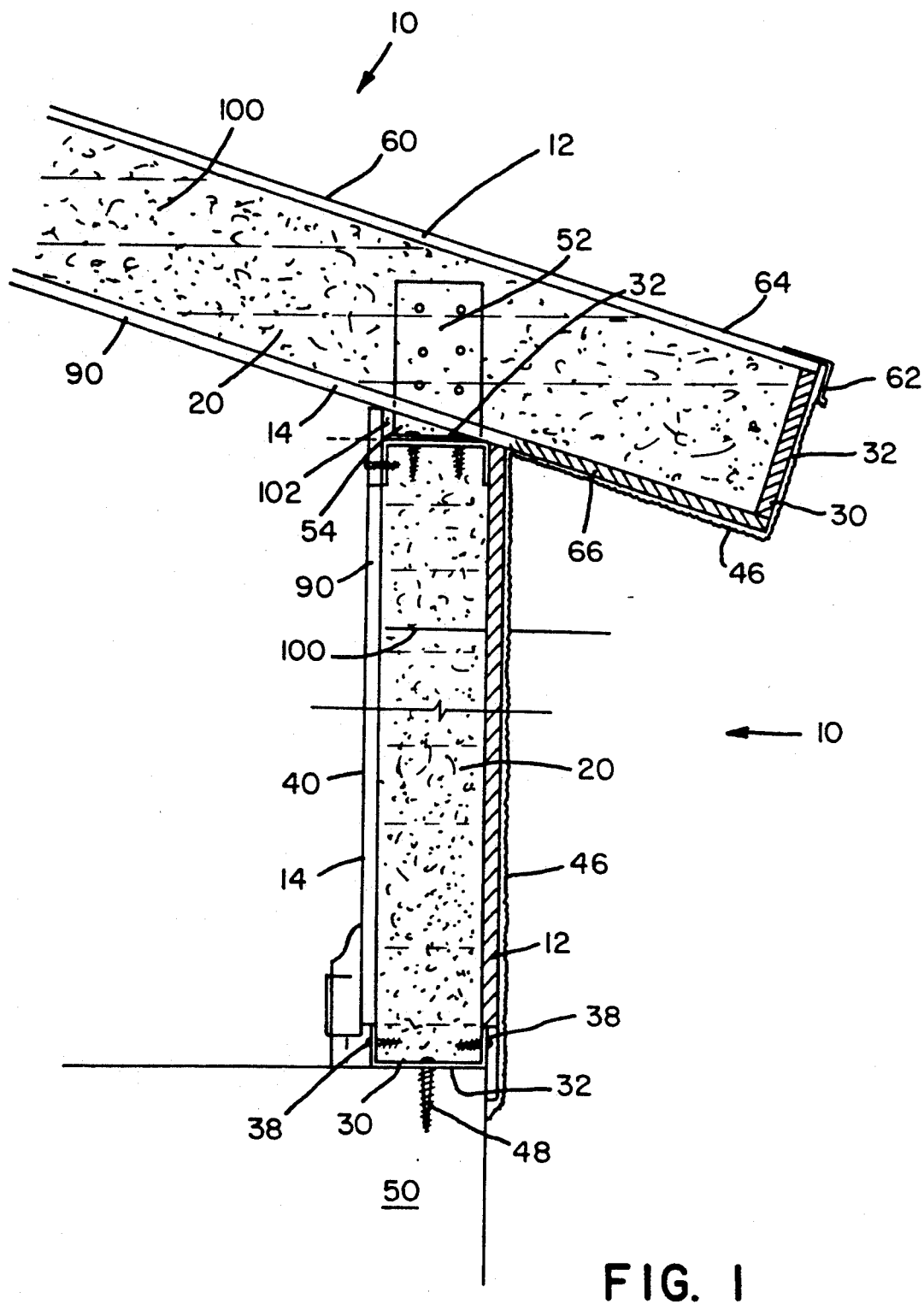
FIG. 1 is a cross-sectional edge view of part of a wall and roof formed of the inventive panel, joined together by at least one fastening angle, and secured to a concrete foundation with at least one concrete screw.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

PREFERRED EMBODIMENTS

Figure 2:
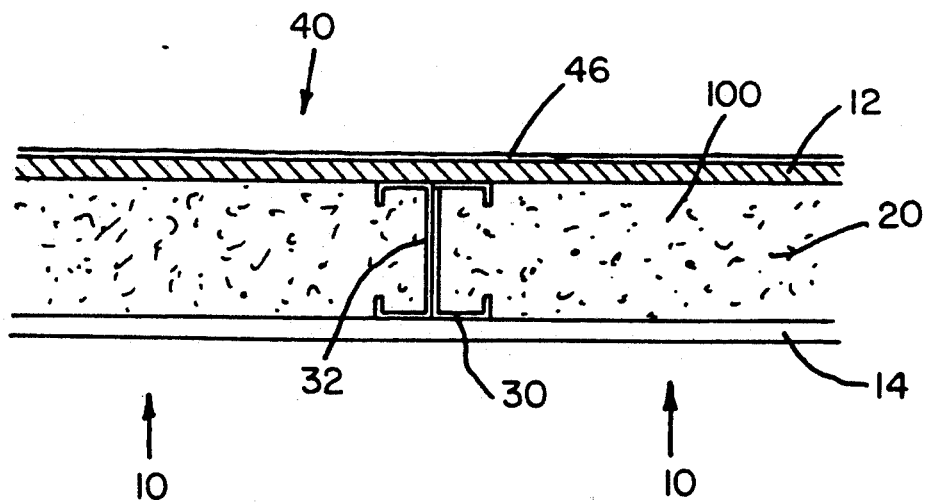
FIG. 2 is a cross-sectional edge view of two wall panels placed edge to edge and the exterior face members covered and sealed with a stucco finish.

Referring to FIG. 1, a panel 10 is disclosed which includes an exterior face member 12, an interior face member 14 and a urethane core 20 between face members 12 and 14. Urethane core 20 provides a combination of superior insulation and superior fire retardance. The compositions of face members 12 and 14 are selected to suit the particular cosmetic and bonding needs presented. Frame members 30, preferably U-shaped channels and preferably made of steel, close the edges 32 of each panel 10. Where frame members 30 are channels, they are oriented to receive core 20.

Where panel 10 is used to form a wall 40 of a building, exterior face member 12 is preferably a type of stucco board known as Densglass. See FIG. 1. A standard stucco finish 46 can then be spread on face member 12 and optionally painted. Interior face member 14 is formed of a material suitable for an interior wall 40 surface, and is preferably drywall. FIG. 2 shows wall panels placed edge 32 to edge 32. If panel 10 is placed over the outer surface of an existing wall to insulate and protect, interior face member 14 can be formed of any material suitable for retaining urethane. At the base of panel 10, a concrete screw 48 may extend through frame member 30 into a foundation 50, as illustrated in FIG. 1. At the top of panel 10, sheet metal screws 38 may join a roof fastening angle 52 to the adjacent frame member 30. If the roof is angled, a wedge-shaped space 54 is formed between frame member 30 and the roof. Space 54 is preferably filled with urethane.

Figure 3:
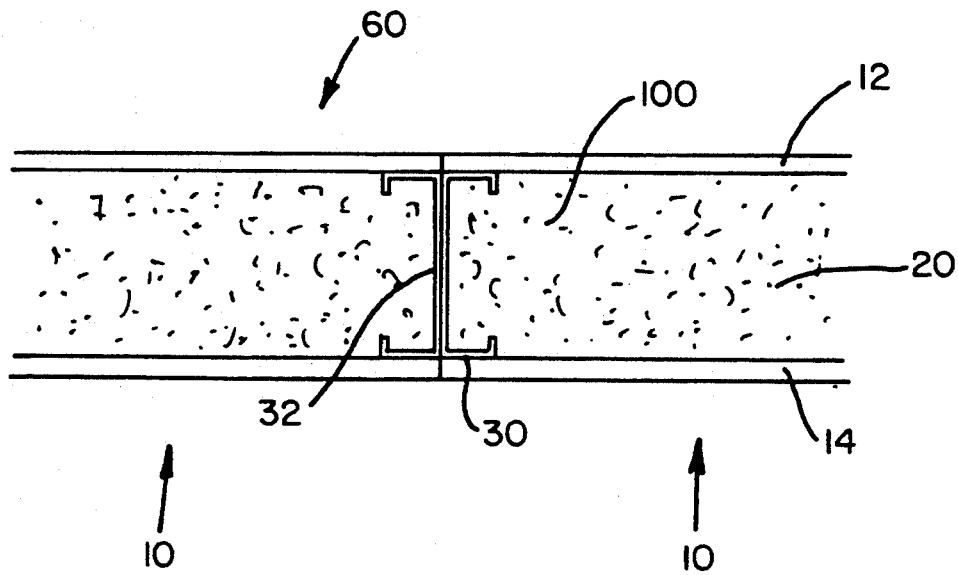
FIG. 3 is a cross-sectional edge view of two roof panels placed edge to edge.

A roof 60 may also be formed of panels 10. They are placed edge 32 to edge 32 as illustrated in FIG. 3. Panels are attached using conventional methods such as lag screws. For this use, exterior face member 12 is preferably plywood decking. A drip edge 62 may be attached to panels 10 where they form the perimeter of roof 60, for deflecting flowing water off panels 10. This is illustrated in FIG. 1. Where panels 10 create an overhang 64, Densglass preferably forms the edge 32 and the exposed lower surface 66 of overhang 64. The Densglass is then covered with stucco finish 46.

Figure 4:
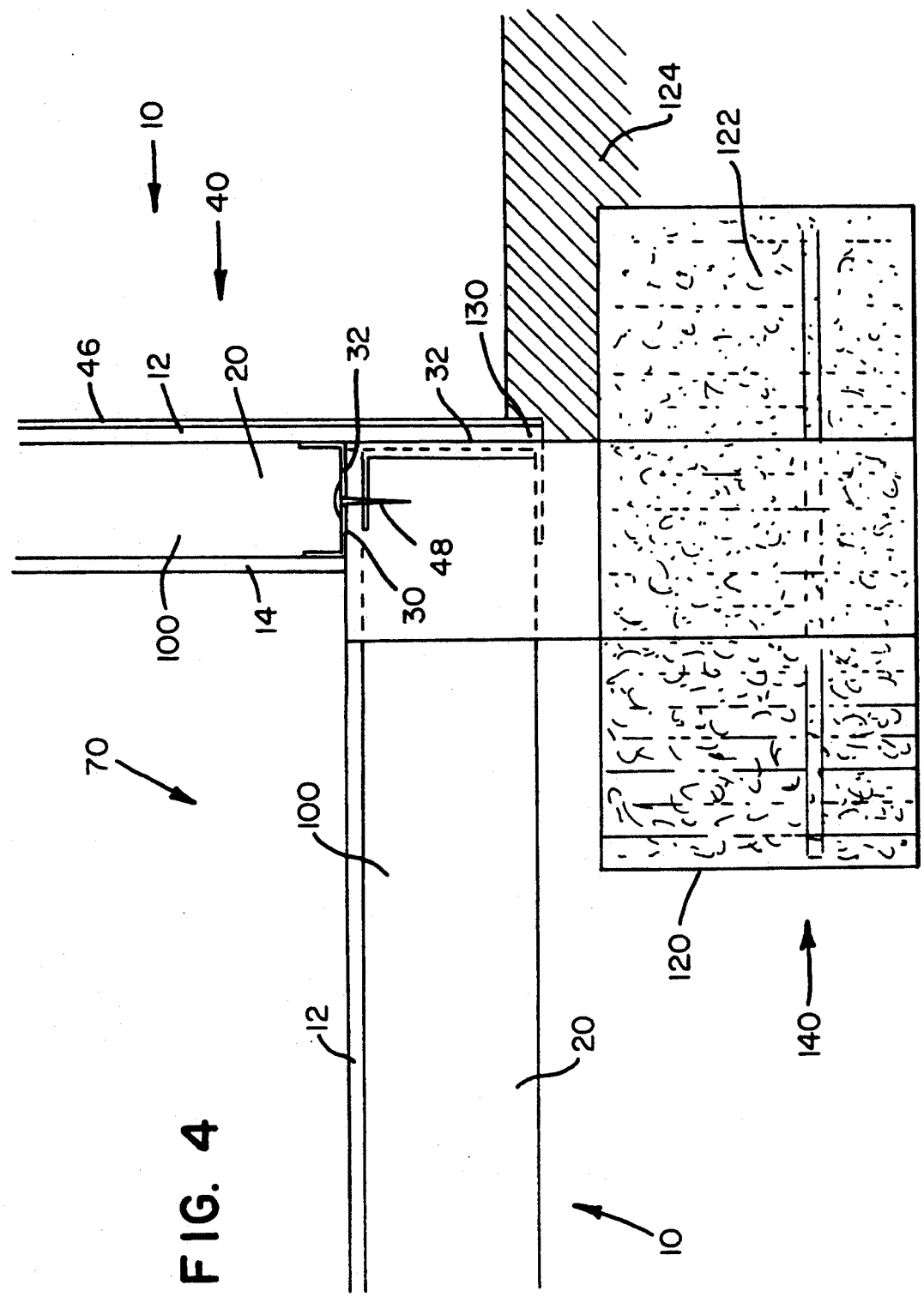
FIG. 4 is a cross-sectional edge view of a floor formed of the inventive panel.

Panels 10 can also form a floor 70. Exterior face member 12 is again preferably plywood decking forming a floor panel having metal structural members 30, and urethane core 20. See FIG. 4. Metal frame members 30 preferably extend through urethane core 20 to enhance compressive and tensile strength, to permit floor 70 to carry substantial weight. When panels 10 are used as floor members, the structure is provided with a support structure 140 preferably consisting of a metal tub 120 or other conventional foundation systems such as pilings or footers with a conventional support beam attached. During construction, metal tub 120 is filled with concrete 122 for stability. The metal tub support structure is covered with fill dirt 124 upon completion of the structure. Attached to the support structure 140 is a bracket 130 fashioned to receive floor panel 10 to fully integrate the structure.

METHODS OF PANEL FORMATION

In practicing the invention, the following methods may be used. Panel frame members 30 are perforated with panel entry ports 80 and joined to form the panel frame 90. Panel face members 12 and 14 are attached to opposing sides of frame 90, which makes face members 12 and 14 mutually parallel, with an enclosed space 100 between them. Urethane foam 102 is pumped through ports 80 into space 100. Space 100 is preferably filled with foam 102, which laminates face members 12 and 14 and frame members 30 together. The urethane foam 102 fills each crevice of space 100, binding each of the structural parts together to form a high strength finished panel. Further, urethane foam 102 in its own right lends structural reinforcement to the panel which yields a high strength, light weight finished product.

Figure 5:
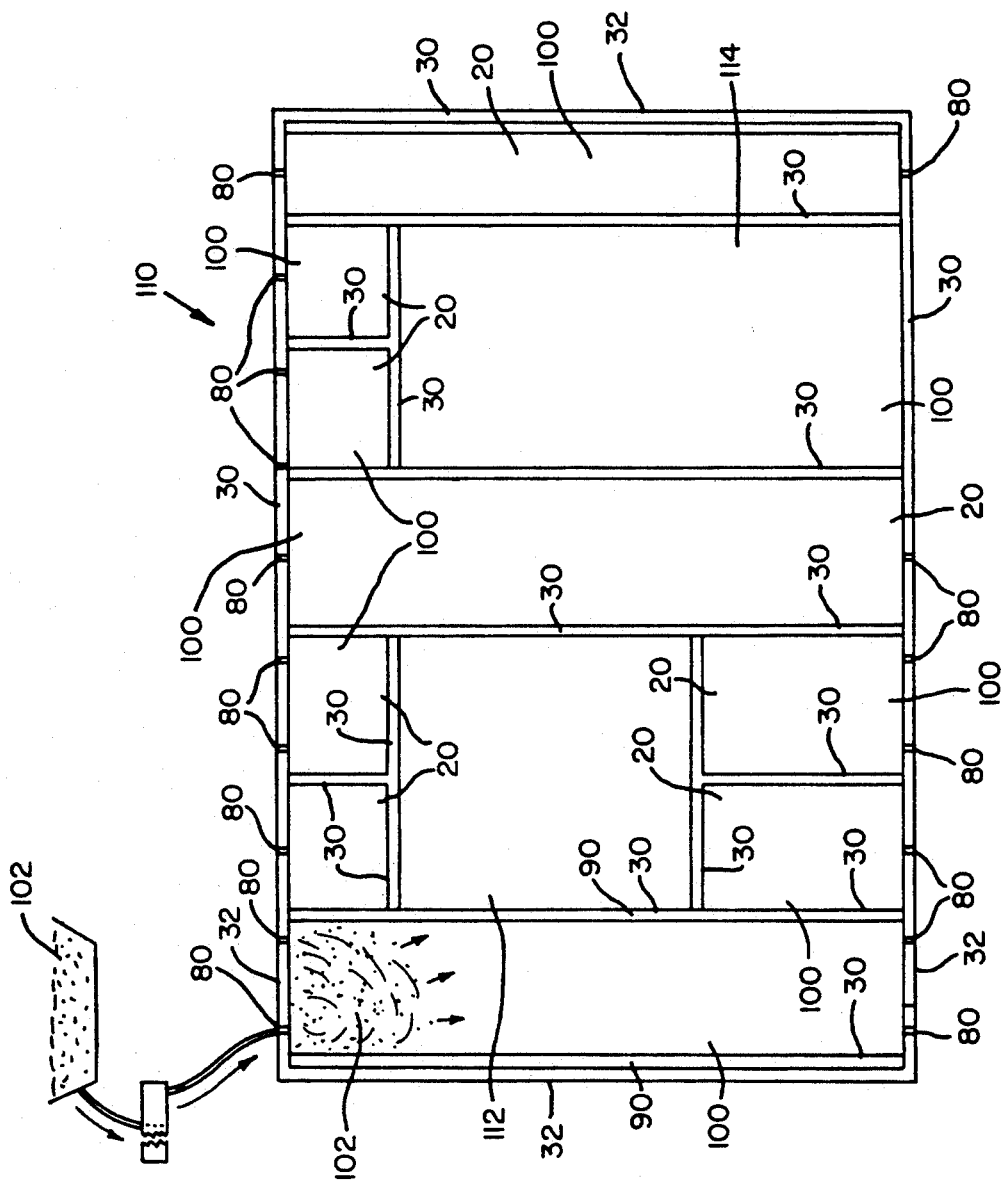
FIG. 5 is a plan view of a complex panel frame which can form an entire wall, and has door and window openings. Ports where urethane foam enters are shown.

Panel 10 may take a simple rectangular shape, but may also be more complex. In the latter instance, frame members 30 are joined to form a frame 110 for an entire wall section, possibly having window 112 and door 114 openings. Rather than one space 100, frame 90 in this instance forms several spaces 100. See FIG. 5. Ports 80 are provided and open into every space 100. Face members 12 and 14 are attached to either side of frame 110 and urethane foam 102 is pumped into ports 80. This type of composite panel is well suited to prefabricated building construction.

Figure 6:
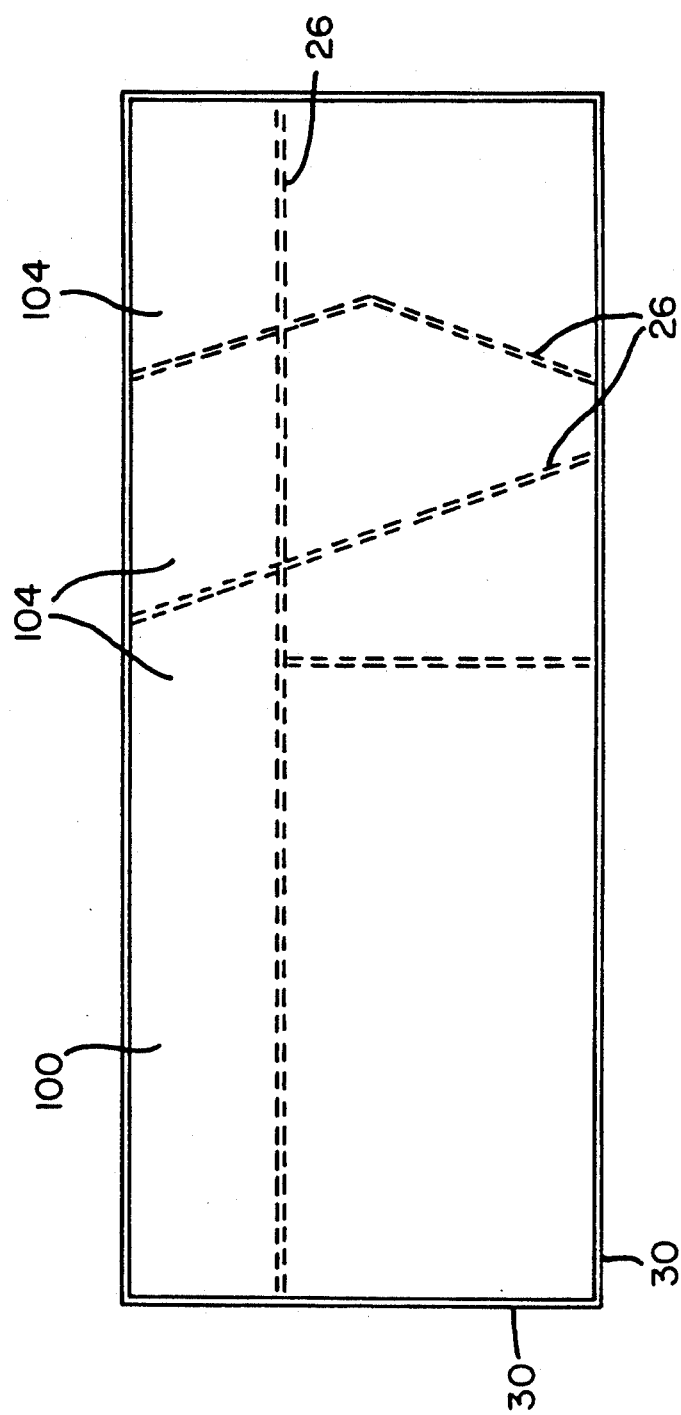
FIG. 6 is a plan view of a urethane mold with various adjustable insert ends which can be utilized to achieve a variety of panel designs. Shown in broken lines are urethane-shaping mold inserts.

For large sized panels 10, it is advantageous to provide adjustable inserts 26 across broad regions of space 100 between frame members 30. See FIG. 6. Adjustable inserts 26 divide space 100 into sub-spaces 104 into which urethane foam 102 is introduced. Adjustable inserts 26 act to retain the shape and integrity of face members 12 and 14 and frame members 30 prior to and during the injection of foam 102. Further adjustable inserts augment the stability and strength of the overall structure. Adjustable inserts 26 may be configured in any desired way to provide adequate support for panel 10.

METHODS OF STRUCTURE ASSEMBLY

A frame 90 is assembled from frame members 30. At least one concrete screw 46 is inserted through frame 90 into a foundation 50, as illustrated in FIG. 1. Roof fastening angles 52 are attached to frame 90 or 110 with sheet metal screws 38. If the roof is angled, and a wedge-shaped gap 54 is formed between frame 90 or 110 and roof 60, this gap 54 is filled with urethane foam 102.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A panel for providing walls, roofs, and floors having thermal insulation and fire retardance, comprising:
    at least two essentially parallel face members separated to form a cavity between said face members;
    urethane disposed within said cavity to provide thermal insulation and fire retardance;
    fixed frame members disposed at the periphery of said face members to provide support for the panel and to enclose said cavity;
    port means provided in at least one of said fixed frame members to permit the introduction of urethane into said cavity;
    at least one adjustable frame member selectively disposed across said cavity to divide said cavity into discrete sub-cavities; and
    additional port means provided in at least one of said fixed frame members to permit the introduction of urethane into each of said sub-cavities.

2. A panel as in claim 1, wherein at least one face member is made of stucco board.

3. A panel as in claim 1, wherein at least one face member is made of drywall.

4. A panel as in claim 1, wherein at least one face member is made of plywood decking.

5. A panel as in claim 1 for forming a roof, additionally comprising a drip edge for deflecting flowing water off the panel.

6. A method for creating a panel for providing insulating and fire retardant walls, floors and roofs, comprising the steps of:
  joining frame members together to form a panel frame of the desired panel dimensions,
  attaching face members to either side pf the panel frame so that at least one enclosed space is formedd within the face members and frame members,
  creating at least one part leading into the at least one enclosed space,
  injecting urethane foam through the at least one port into the at least one enclosed space,
  providing the panel with an adjustable frame member dividing said enclosed space into at least two subspaces.

7. A method as in claim 6, wherein the at least one port is created in at least one frame member.

8. A method as in claim 6, wherein at least one screw is fitted through the frame into an object separate from the panel to secure the panel in position.

9. A method as in claim 6, wherein the frame members are positioned and the face members are cut to provide at least one window opening through the panel.

10. A method as in claim 6, wherein the frame members are positioned and the face members are cut to provide at least one door opening through the panel.

* * * * *